(No Model.) 7 Sheets—Sheet 3.
M. J. OWENS.
MACHINE FOR BLOWING GLASS.
No. 548,588. Patented Oct. 22, 1895.
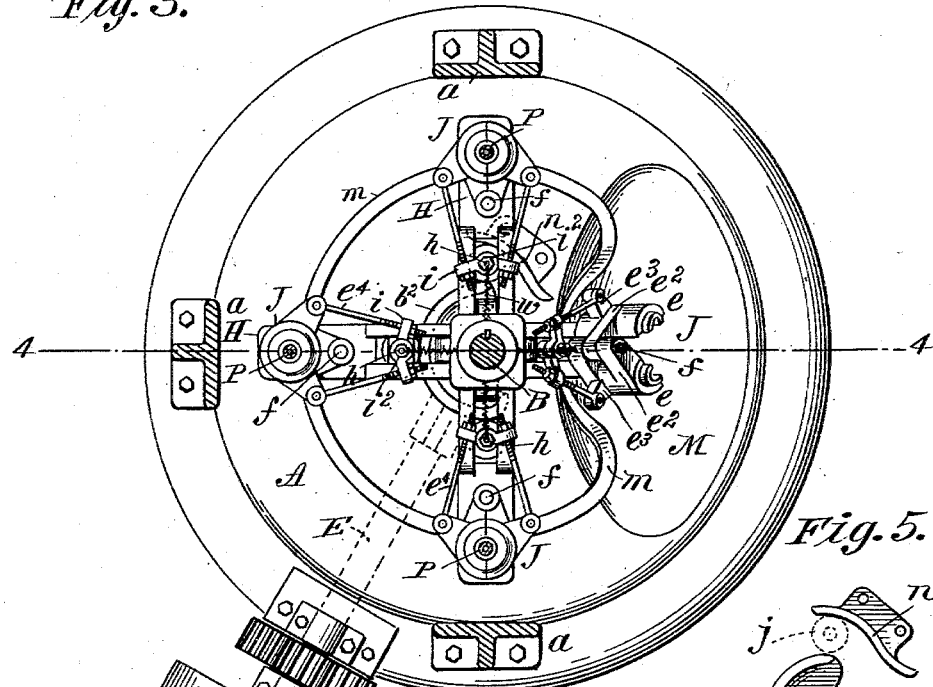
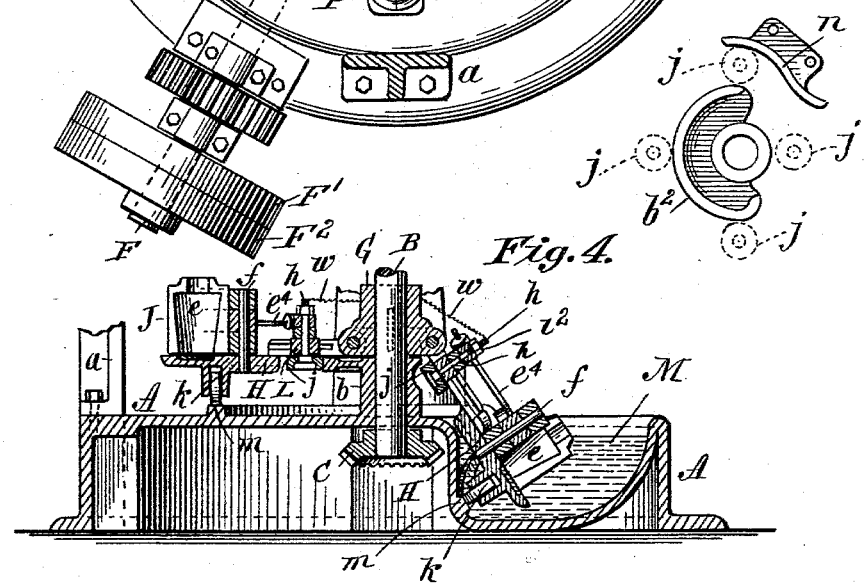

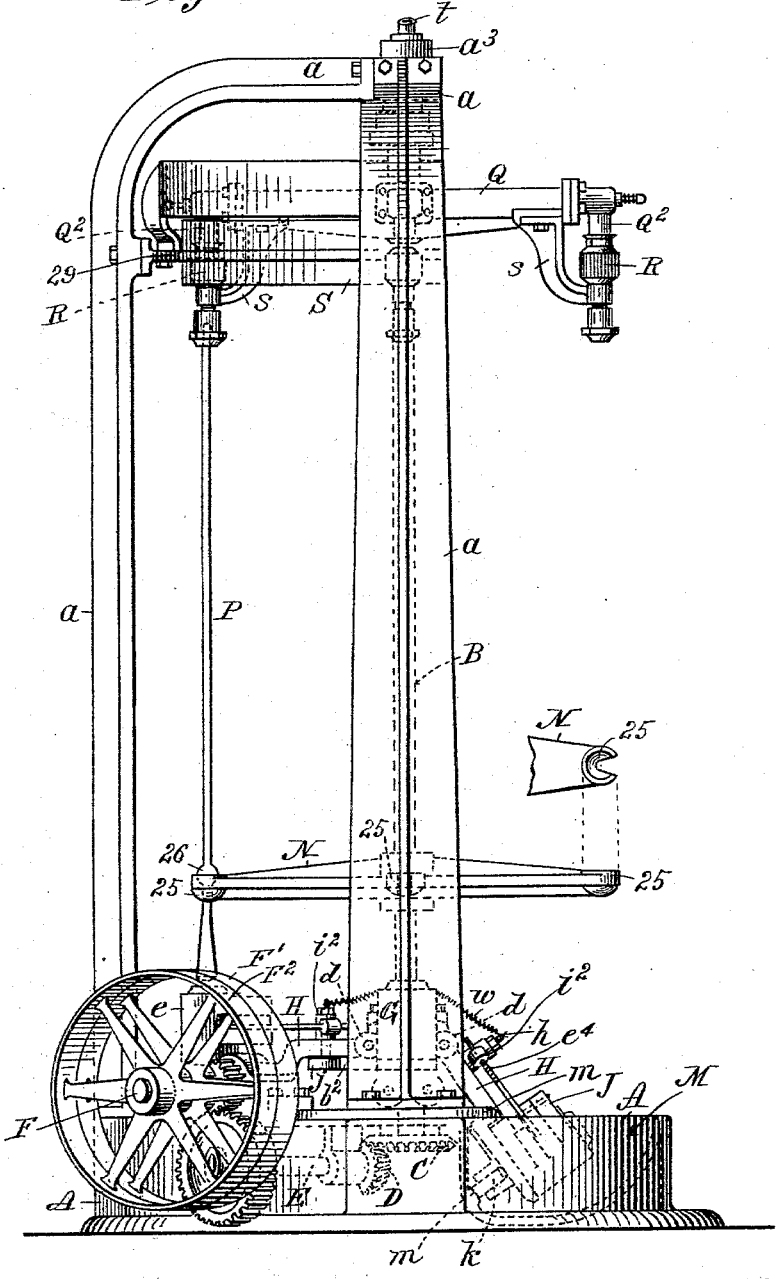

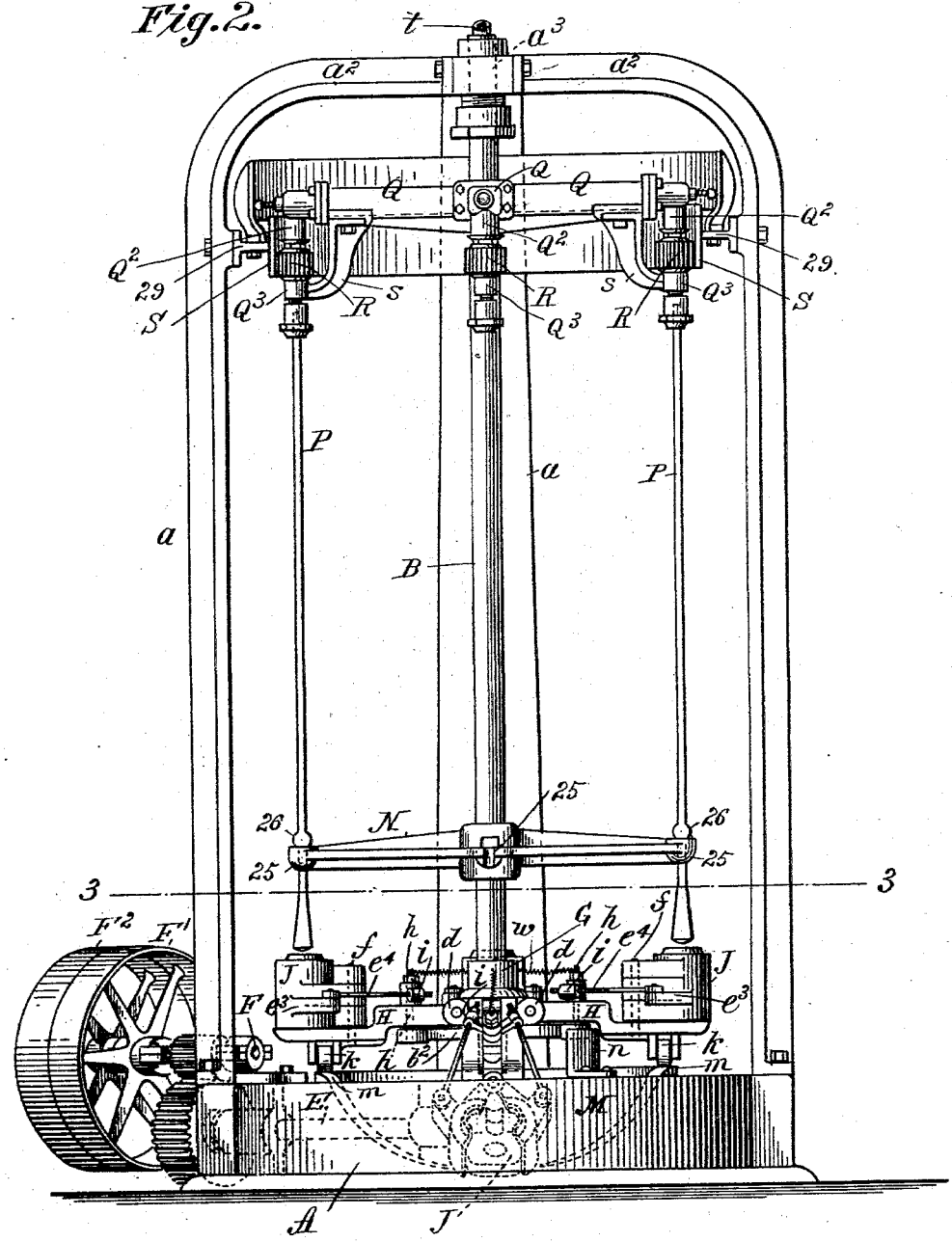

(No Model.) 7 Sheets—Sheet 4.

M. J. OWENS.
MACHINE FOR BLOWING GLASS.

No. 548,588. Patented Oct. 22, 1895.

Witnesses:
J. N. Garfield
H. J. Clemons

Inventor:
Michael J. Owens,
by Chapin &co.
Attorneys.

(No Model.) 7 Sheets—Sheet 5.
M. J. OWENS.
MACHINE FOR BLOWING GLASS.
No. 548,588. Patented Oct. 22, 1895.
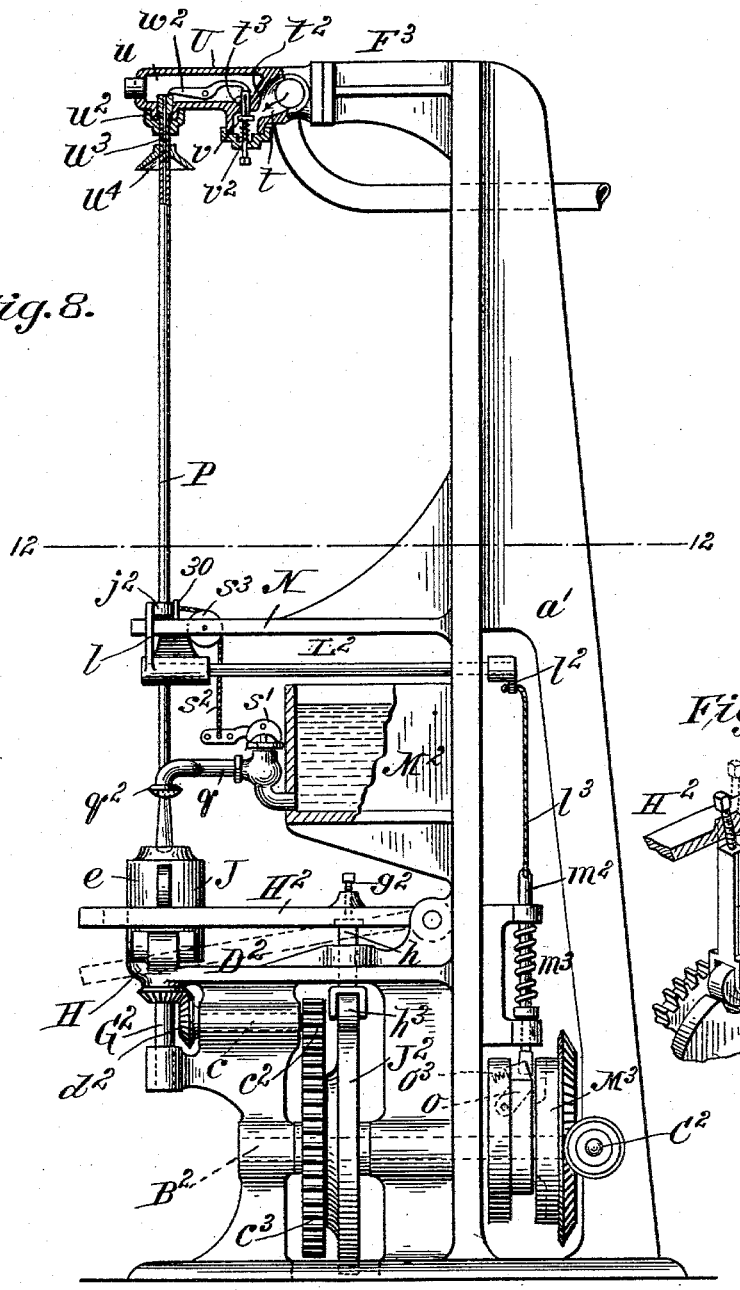
Witnesses:
J. A. Garfield
A. J. Clemons
Inventor
Michael J. Owens.
by Chapin &c
Attorneys (No Model.)
M. J. OWENS.
MACHINE FOR BLOWING GLASS.
No. 548,588.
7 Sheets—Sheet 6.
Patented Oct. 22, 1895.
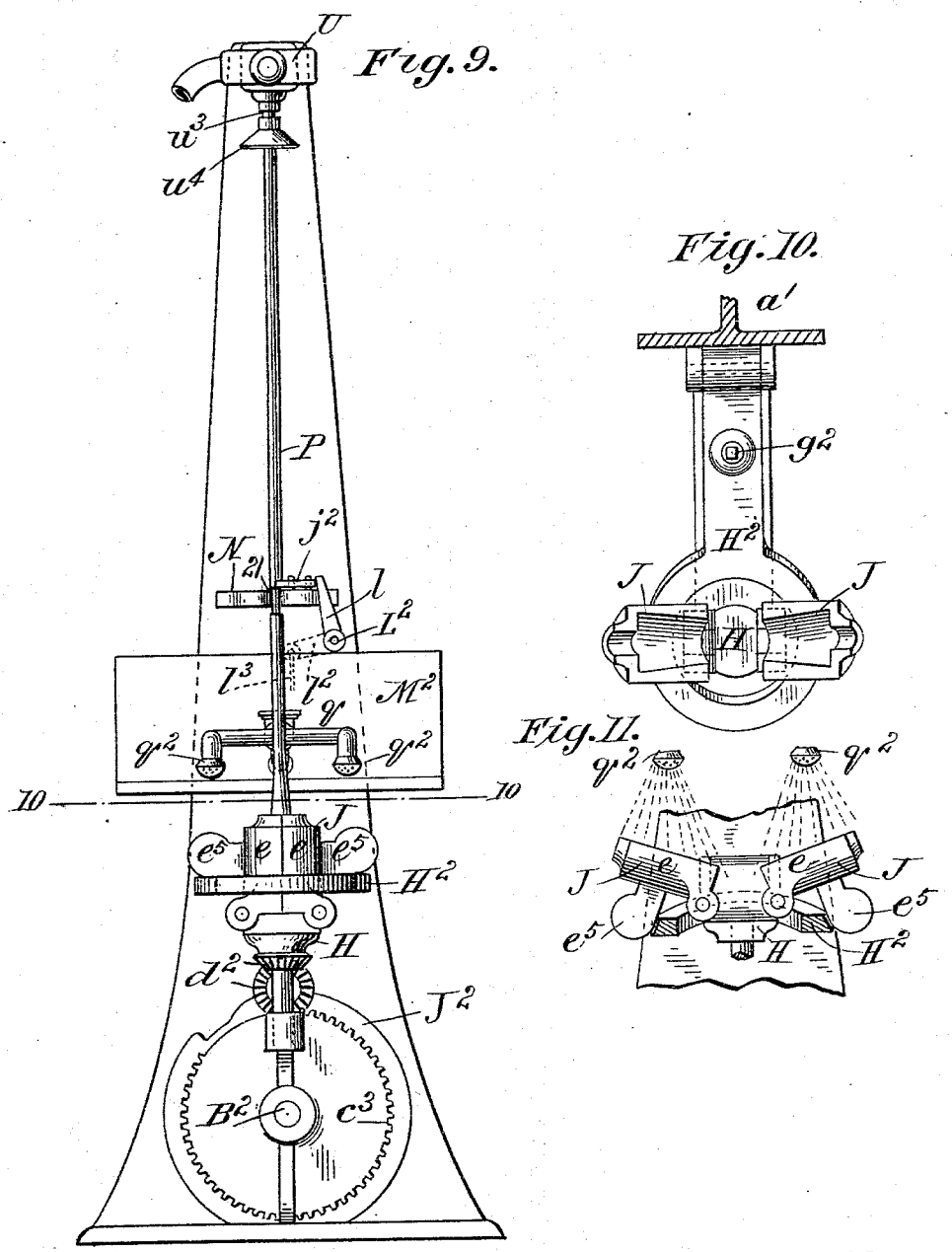
Witnesses:
J. A. Garfield
H. I. Clemons
Inventor
Michael J. Owens
by Chapin & Co.
Attorneys (No Model.) 7 Sheets—Sheet 7.
M. J. OWENS.
MACHINE FOR BLOWING GLASS.
No. 548,588. Patented Oct. 22, 1895.

Witnesses:             Inventor.
                       Michael J. Owens
                       by Chapin & La
                            Attorneys

UNITED STATES PATENT OFFICE.

MICHAEL J. OWENS, OF TOLEDO, OHIO, ASSIGNOR OF ONE-HALF TO EDWARD D. LIBBEY, OF SAME PLACE.

MACHINE FOR BLOWING GLASS.

SPECIFICATION forming part of Letters Patent No. 548,588, dated October 22, 1895.

Application filed July 23, 1895. Serial No. 556,948. (No model.)

*To all whom it may concern:*

Be it known that I, MICHAEL J. OWENS, a citizen of the United States of America, residing at Toledo, in the county of Lucas and State of Ohio, have invented new and useful Improvements in Machines for Blowing Glass, of which the following is a specification.

This invention relates to improvements in machinery for blowing glass into sectional molds, and particularly to the organization in a machine of means for severally and respectively performing automatically and mechanically operations which heretofore have been done manually or through the operation of implements or devices which have been manipulated or in some manner actuated by or dependent upon hand, foot, or lung power.

Reference is to be had to the accompanying drawings, in which—

Figure 6:
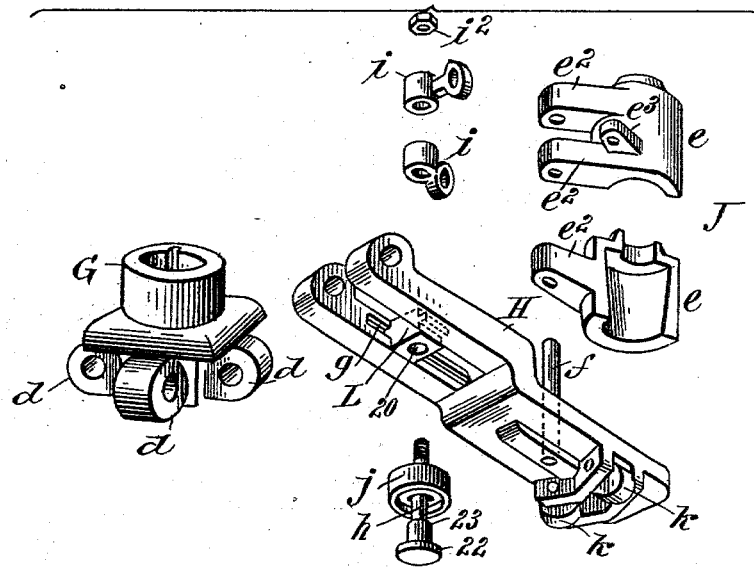
Figure 7:
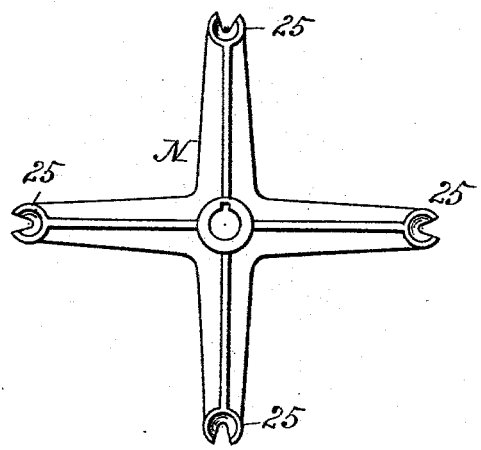
Figure 12:
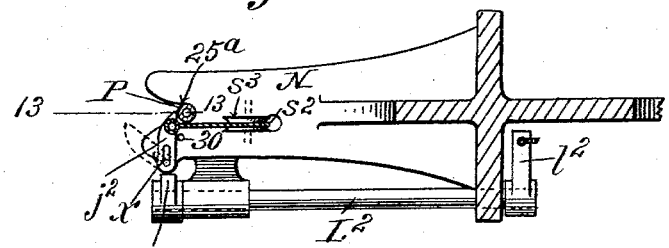
Figure 13:
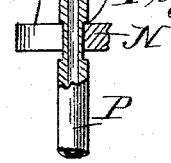
Figures 14, 17:
Figure 15:
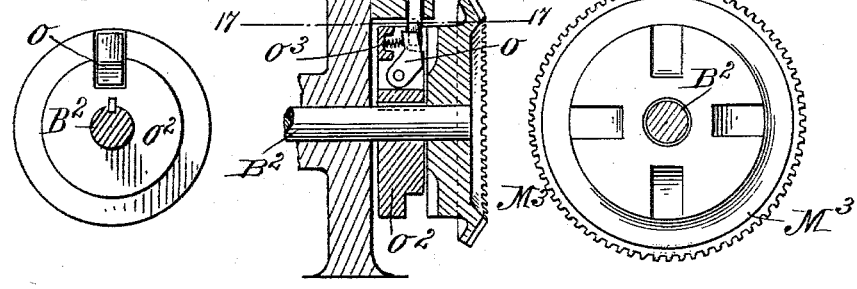
Figure 16:
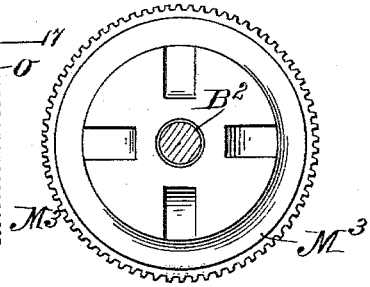

Figure 1 is a front elevation of an improved form of a glass-blowing machine embodying in an operative and satisfactory manner the subject-matter and principles of the present invention. Fig. 2 is a side elevation of the same. Fig. 3 is a plan view of that portion of the machine which is seen below the plane indicated by line 3 3, Fig. 2. Fig. 4 is a central vertical section at the lower part of the machine as taken on the plane indicated by the section-line 4 4, Fig. 3. Fig. 5 is a plan view of cam or constraining devices for affecting the sectional molds. Fig. 6 is a perspective view of parts of one of the sectional molds and of supporting and other co-operative parts. Fig. 7 is a plan view of the support for the removable blowpipe. Fig. 8 is a side elevation, with some parts in section, of an automatic glass-blowing machine constructed under the present invention, but differing with respect to details of construction. Fig. 8ᵃ is a perspective view of the mechanism which operates the yoke that closes the mold and permits it to open. Fig. 9 is a front elevation of Fig. 8. Fig. 10 is a horizontal section as taken on the line 10 10, Fig. 9, showing the sectional mold and the automatically-operating yoke therefor. Fig. 11 is a front elevation of the parts shown in Fig. 10, the yoke being seen in vertical section. Fig. 12 is a plan view as seen below the plane indicated by the line 12 12, Fig. 8. Fig. 13 is a vertical sectional view of parts as taken on the line 13 13, Fig. 12. Fig. 14 is a central vertical section through the clutch mechanism which effects the starting and automatic stopping of the machine which as a whole is seen in Figs. 8 and 9. Fig. 15 is a cross-sectional view of the intermittently-operating shaft on which the clutch is mounted, together with a face view of the clutch. Fig. 16 is a view as taken on the same plane of cross-section as Fig. 15, but looking in the opposite direction, whereby the face of a constantly-rotating gear-wheel is seen. Fig. 17 is a plan view of the parts seen in Fig. 15 below the plane indicated by 17 17 on Fig. 14.

The present invention consists, in the embodiment in an automatic glass-blowing machine, of means or instrumentalities which are found in common in both types of the machine illustrated in the accompanying drawings—that is to say, the invention consists, in a machine for blowing glass, in an air-conduit, a sectional mold, a removable blowpipe, means for supporting the blowpipe in operative relation to the air-conduit and to the mold, and means for automatically closing said mold after the introduction of the blowpipe in its support and for automatically opening the mold prior to the removal of the blowpipe.

The invention also consists, in a machine for blowing glass, in an air-conduit, a sectional mold, a removable blowpipe, means for supporting the blowpipe in operative relation to the air-conduit and to the mold, means for automatically closing said mold after the introduction of the blow pipe in its support and for automatically opening the mold prior to the removal of the blowpipe, and means for cooling the mold while open.

The invention furthermore consists in the combination, in an automatic glass-blowing machine, of a sectional mold, an air-conduit, a removable blowpipe, a support by which the removable blowpipe may be temporarily sustained in connection with the air-conduit and in operative relation to the mold, means for imparting with respect to the blowpipe and mold a rotational movement, the one relative to the other, and means for automatically opening and closing the sectional mold.

The invention further consists in combinations of devices and parts which refer more particularly to the type of machine illustrated in Figs. 1 to 7, inclusive, all substantially as will hereinafter more fully appear and be set forth in and covered by the claims.

The machine shown in Figs. 1 to 7, inclusive, is a multiple-mold machine, while that shown in the latter figures is a single-mold machine. The multiple-mold machine will be first described sufficiently in detail, as follows:

A represents the base of the machine, which is circular, and having rising from the edges thereof the uprights $a\ a\ a$, the upper portions of which are joined by the arches $a^2\ a^2\ a^2$, which unite at the central hub $a^3$, in which the upper end of the central vertical shaft B is journaled. Said shaft is also journaled near its lower end in the upstanding hub $b$ of the base, receiving below the hub, which latter is suitably distant from and above the floor, the bevel gear-wheel C. With this bevel gear-wheel meshes a bevel-pinion D on the horizontally-mounted counter-shaft E, which is geared to the horizontal driving-shaft F, provided with the fixed and loose driving-pulleys $F'\ F^2$, thereon. The vertical shaft B is supported in its journal-bearings by having the collar G fixed thereon next above the said upstanding base-hub $b$. Said collar G, as particularly seen in Fig. 6, at the left, has four radially-projecting ear-lugs $d\ d$, to which are respectively pivotally hung the bifurcated inner ends of the mold-carriers H, of which there are four for the four sectional molds J with which the machine is provided. Each mold J, which may be one of a great variety of forms or contours, is formed in the two parts $e\ e$, Figs. 3 and 6, with the lugs $e^2\ e^2$, which, with the upstanding stud $f$ of the mold-carrier, constitute the hinge-supporting means for the opening and closing mold. Each mold-section, furthermore, has a radially-projecting lug $e^3$, with which is connected one of the mold-operating rods $e^4$.

A slide-block L is mounted for a slide movement in the ways $g$ therefor at the inner edges of the bifurcated portions of each mold-carrier. This slide-block has the vertical perforation 20, upwardly through and beyond which is passed the stud $h$, headed and shouldered, as at 22 and 23, at and near its bottom and screw-threaded at its upper end. The hubs of the arms $i\ i$ are set about the upper end portion of the stud $h$, and the nut $i^2$ firmly clamps said hubs against the upper side of the slide-block, bringing the shoulder 23 hard against the under side of said block, and said clamping bind of the nut confines the arms $i\ i$ in their angular relations. The extremities of the arms are perforated, receiving therethrough the ends of the aforementioned connecting-rods $e^4$, which are connected to and operate the mold-sections. The ends of the said connecting-rods are screw-threaded and passed quite loosely through the perforations in the said arms $i$, whereby as the arms have their movements on and as one with the slide the connecting-rods may have slight swinging movements, as permitted by the sufficiently large perforations in the ends of the arms $i$, to accord with the change in their direction which they necessarily acquire in consonance with the swinging of the mold-sections. The roller $j$ is applied to freely rotate about the stud, on the lower headed end of which it is supported below the slide-block.

Each mold-carrier H has provided therefor at its under side one or more antifriction-rolls $k$, arranged to have their rotation in planes crosswise of the lengths of the mold-carrier to run on the track $m$, provided on the top of the bed.

It is clearly shown in Figs. 3 and 4 and indicated in Figs. 1 and 2 that at one side of its center the base A has the basin M, down into and out from which the said track takes its course, this course of the track, however, being deflected toward the center of the base as it descends. The aforesaid upstanding hub $b$ has at its upper edge, opposite the basin, the semicircular flange $b^2$, around on which the rollers $j$ of the slide run as the mold-carriers revolve. Opposite and located outwardly beyond one end of the semicircular flange $b^2$ is a flange or cam-rib $n$, upstanding from the top of the bed near the basin, the operation of which is to impinge against the roller of each slide on each mold-carrier as it approaches the basin to so force the slide inwardly as to cause, through the connections described, the automatic opening of the mold just previous to the instant that the mold-carrier and mold plunge into the cooling liquid in the basin. After the mold has passed through and out from the basin, and directly after the instant in which the glass-blower may support the newly-prepared blowpipe in the machine, the roller $j$ of the mold-carrier is impinged upon by the radially-prominent end or part of the said semicircular flange $b^2$, whereby the slide is caused again to move outwardly and the mold-sections to be closed. The springs $w$ are applied for keeping the molds open when they are immersed, their reaction being next thereafter overcome by the action of rib $b^2$ on roller $j$ under each mold-carrier H. The aforementioned central vertical shaft B has fixed thereon, at some little distance above the mold-carriers, the blowpipe-carrier N, which, as shown in Fig. 7, is in the form of a spider having the four radial arms. Each arm has at its end the cup-formed depression 25, outwardly opening, in which may temporarily rest the shoulder or enlargement 26 on the blowpipe P, as plain.

Near the upper end of the shaft B and affixed thereto is a revoluble air conduit or receptacle, the same in the arrangement as shown having the four radially-projecting tubular arms Q, they being in communication with the central and common air-supplying tube or conduit $t$. Each of these tubular arms Q has a depending and downwardly-opening hollow hub $Q^2$, adjacent which is the pendent bracket-arm $s$, in the extremity of which is supported and journaled for rotation the vertical tube $Q^3$, the upper end of which is entered for air-communication from the source of air-supply within the said depending hollow hub $Q^2$. The lower end of the said vertical and rotatable tube $Q^3$ has the sleeve screwed thereon, which is formed with the downwardly-flaring orifice (and which may advantageously be bushed with rubber) within which the upper end of the blowpipe may be quickly entered to be in a manner supported and steadied and to receive through it the air-pressure from the arm and depending tube Q $Q^3$. Each of the said rotatable tubes has thereon the frictional roller R, at the same level with which is the semicircular flange or rib S, sustained by the supporting bracket-pieces 29, which inwardly extend from the uprights $a$ $a$. The arrangement of this rib is high above and concentric with the flange $b^2$ and diametrically opposite from the basin M. Therefore as the hollow arms Q and vertical tubes $Q^3$, which are adjuncts thereof, have their revoluble movements, the rollers R, being in frictional contact with the said semicircular rib, will impart to the blowpipes, which have their bodily revoluble movements, as understood, also motions of rotation on their own axes during the period of their circuit from the place of their entrance into the machine and mold thereof at one side of the basin around to near the opposite side of the basin, for the effect of rotating the glass being blown within the molds, which latter, relative to the rotating blowpipes, have no movements except the opening and closing movements.

The machine for blowing glass illustrated in Figs. 8 to 16, inclusive, embodies a means for supporting the blowpipe with its one end in communication with an air-supplying device and its other in its operative proximity to or within the mold, certain means for automatically admitting the air through the blowpipe, a sectional mold which is adapted to be closed about or adjacent the gathering end of the blowpipe and to be also automatically opened, whereby the paste-covered inner surface thereof may be subjected to a sprinkling or cooling action, means for automatically effecting the closing and afterward the opening of the mold-sections and for imparting to them while they are closed rotary motions, and means for automatically causing a sprinkling of the paste-lined mold-sections while opened. In this form of the machine the automatic operations are instituted by and in consequence of the placing of the blowpipe, which has the gathering of glass thereon, in the machine in its position of support with its one end in communication with the air-supplying receptacle or conduit and its other end in its operative relation to the mold.

A detailed description of the mechanism and parts thereof which are comprised in the second form of the glass-blowing machine will now be given, as well, also, as will be the operation thereof.

The machine embodies the standard $a'$, of suitably massive and stable construction and having a wide base, and has near the bottom thereof bearings for the horizontal rotatable shaft $B^2$ and also for the driving-shaft $C^2$. Above the shaft $B^2$ are, at varying heights, the forwardly-extending shelf-like projections $D^2$, N, and $F^2$. The bracket $D^2$ has vertical bearings for the shaft $G^2$, which at its upper end carries the base or mold-support $H^2$, upon which the mold-sections $e$ $e$ are pivotally supported, they having suitable ears which are pinned to lugs provided upon said base. The mold-supporting shaft $G^2$, by the bevel-gears $d^2$, has connection with the counter-shaft $c$, which also has the pinion $c^2$ thereon, that meshes into the gear $c^3$, which is fixed on shaft $B^2$. Above the bracket $D^2$ is the hinged yoke $H^2$, which encircles the mold-base and is adapted upon its upward-swinging movement to have a cam-like impingement against the edges of the weighted wings $e^5$ of the mold-sections and thereby to swing said sections against their tendency to gravitate and open into their closed positions, which positions are seen in Figs. 8 and 9. The yoke has the depending-adjustable screw $g^2$, the lower end of which is in bearing against the vertically-movable bar $h^2$, the roller $h^3$, journaled at the lower end thereof, resting peripherally upon the cam-wheel $J^2$, which is fixed upon the aforesaid shaft $B^2$.

The bracket N, as particularly seen by Figs. 12 and 13, has the recess $25^a$ within its forward edge, the width of which at its inner boundary is such as to permit the engagement thereat of the necked-down portion 21 of the blowpipe P. The dog $j^2$ is mounted upon the top of the bracket N and is connected to swing thereon across and away from across said recess 21, and also to have in addition to its swinging movement an endwise-sliding movement, all by reason of the pin-and-slot connection indicated at $x$, Fig. 12. The stop-pin 30 limits undue inward-swinging movement of this dog. Under and alongside of the bracket N is a rock-shaft $L^2$, having at its opposite ends the upwardly and the more or less nearly horizontally extending arms $l$ and $l^2$, the one $l$ being in engagement with the aforesaid dog $j^2$, to be by the dog swung when the latter has imparted to it its endwise sliding movement. The other arm $l^2$ has connected to it the flexible connection $l^3$, which is secured to the bar $m^2$, which is movable vertically in suitable guideways therefor. This bar has applied thereto the spring $m^3$, whereby it normally is forced to the limit of its downward movement, which is in the path of the clutch-dog $o$, carried by and within a suitable recess of the clutch-carrier $o^2$, which is affixed upon the aforesaid shaft $B^2$. The spring $o^3$ exerts a tendency to move the dog $o$, when it may be permitted so to be moved, into clutch engagement with the wheel $M^3$, which is loose and constantly rotating upon the shaft $B^2$ by reason of its being geared to the driving-shaft $C^2$. The lower extremity of the aforesaid bar $m^2$ is beveled, as seen by the cross-section of this bar which appears in Fig. 17.

The reservoir $M^2$ is supported beneath the bracket N, which is the blowpipe-support, and between it and the level of the sectional paste-mold, and has the conduit $q$ leading forwardly from its front end and terminating in the branched extremities which are provided with the downturned sprinklers $q^2$, arranged and directed for sprinkling the paste-lined surfaces of the mold-sections when the latter are permitted to be swung open. (See Fig. 11 particularly.) The conduit $q$ has the valve which is sufficiently indicated at $s'$, and to the operating handle or lever thereof is secured the cord $s^2$, which runs therefrom upwardly around the sheave $s^3$ to a connection with the aforesaid dog $j^2$.

The bracket $F^3$ supports the hollow arm U, which has the two chambers or passages $t$ and $u$ therein, one leading from the source of air-supply and the other terminating in the downwardly-directed opening $u^2$, within which is the vertically-movable tube $u^3$, having at its lower end the downwardly-flaring receiving-socket $u^4$ for the upper end of the blowpipe P. The passages $t$ and $u$ are separated by the web-wall $t^2$, having the opening $t^3$, which forms communication between said passages. The opening $t^3$ is normally closed by the valve $v$, to which is provided the spring $v^2$. The intermediately-pivoted lever $w^2$ has one end in bearing engagement against the upper end of the aforesaid vertically-movable tube $u^3$, and its other arm rests upon the top of the valve-stem.

When the blowpipe has its shouldered central portion 21 moved into the recess $25^a$ at the forward edge of the shelf-like blowpipe-support which the blowpipe engages for its support, it exerts a cam-like action against the inclined end of the dog, causing the latter to move endwise, which it is permitted to do by reason of the slot within which the pivot seen at $x$ protrudes. This imparts, against the resistance of the spring $m^3$, a swinging movement to the rock-shaft arm $l$, a rocking movement to the said shaft, a swinging movement to the rock-shaft arm $l^2$, and an endwise drawing of the vertical trip-bar $m^2$, which releases the clutch-dog to the action of its spring $o^3$, whereby the clutch is thrown into engagement with the constantly-rotating wheel $M^3$, which is loose on the shaft $B^2$. This clutch is of a well-known kind and is illustrated in Figs. 14 to 17, inclusive, and having made one revolution the clutching-dog, by impingement against the beveled side of the trip-bar, (which, after having been raised to permit the clutch to start, promptly snaps back by reason of the spring to its original position in the path of revolution of the clutch-dog,) forces the dog inwardly within the recess therefor and out of clutch, whereby further rotary motion is arrested until the next operation. The above-described automatic clutch per se is not a new device.

Preparatory to starting the machine the cam-wheel which is on the intermittently-rotating shaft $B^2$ stands with the lowest part of the cam upward and in contact with the cam-roll on the vertically-movable bar $h^2$ of the mold-yoke, which latter, therefore, is dropped to its lowest position by gravity, the molds having automatically opened, all as seen in Figs. 10 and 11; but as the cam begins its movement it effects the raising of the yoke and the maintenance thereof in its raised position until the cam has completed its circuit, whereupon the yoke descends and the mold-sections open by reason of the gravity effect of the weighted wings thereof. The mold-supporting shaft, deriving its rotary movement concurrently with the elevation of the mold-yoke, through the aforementioned gearing $d^2\ d^2\ c^2\ c^3$, has its speed multiplied so that the mold has several rotations around the stationary blow-pipe before being permitted to open. As the yoke is next permitted to descend at the time when the machine stops, whereby the mold-sections are spread open with their inner surfaces upward and whereupon the blowpipe may be removed, there will be concurrent with the removal of the blowpipe and outward swinging of the dog $j^2$, through the cord-and-lever connection with the valve $s'$ in the conduit leading from the liquid-reservoir to the sprinklers, an opening of said valve, resulting in the sprinkling of the exposed paste-covered surfaces of the mold-sections.

Of course it is to be understood that when the blowpipe is brought to its position in the flaring socket $u^4$ by forcing the endwise-movable tube $u^3$ upward, which it does as it seats itself, it swings the lever $w^2$ to open the valve to the communication with the air-supplying conduit or reservoir, the opened communication continuing until the removal of the blowpipe.

In both examples of mechanical automatic glass-blowing machines here presented there is, as regards the blowpipe and mold with which it co-operates, a rotational movement, the one with relation to the other. In the one instance the paste-mold is non-rotatable on its base or carrier, the blowpipe having imparted thereto the rotational movements, while in the other the blowpipe is permitted to remain stationary and the rotary movement is imparted to the paste-mold. In either case the result of the rotation of the one or other of the parts is the same in that it overcomes seam-marks and imparts to the blown and molded article a perfectly-smooth surface.

It becomes apparent from the foregoing descriptions and accompanying illustrations that while the two types of machines are widely different in respect to the detailed construction of the devices and parts thereof, and are in some respects quite different in their organizations, the said two types of machines have features in common and comprise certain substantially-identical principles or ideas of means which are defined in the statement of invention and the claims; and it is particularly to be observed that these machines are automatic in all respects, the attendant having only to gather the glass on the removable blowpipes and place them in the machine and afterward remove the blowpipes and blown and molded product, no lung-blowing, or foot or hand operations or manipulations, or operations requiring skill, precision, or intelligence being required.

In conclusion I state that along with broad claims which embrace both species of machines heretofore described I include in this application more specific claims directed to that species of machine illustrated in Figs. 1 to 7, inclusive. The other species of machine, Figs. 8 to 17, inclusive, is the subject of a separate application in my name for Letters Patent, filed April 1, 1895, Serial No. 543,987.

Having thus described my invention, what I claim, and desire to secure by Letters Patent, is—

1. In an automatic machine for blowing glass, an air-conduit, a sectional mold, a removable blow-pipe, means for supporting the blow-pipe in operative relation to the air-conduit and to the mold and means for automatically closing said mold after the introduction of the blow-pipe in its support and for automatically opening the mold prior to the removal of said blow-pipe.

2. In an automatic machine for blowing glass, an air-conduit, a sectional mold, a removable blow-pipe, means for supporting the blow-pipe in operative relation to the air-conduit and to the mold, means for automatically closing said mold after the introduction of the blow-pipe in its support and for automatically opening the mold prior to the removal of said blow-pipe, and means for cooling the mold while open.

3. In an automatic glass-blowing machine, a sectional mold, an air-conduit, a removable blow-pipe, a support by which the removable blow-pipe may be temporarily sustained in connection with the air-conduit and in operative relation to the mold, means for automatically opening and closing the mold, and means for imparting, with respect to the blow-pipe and mold, a rotational movement of the one relative to the other.

4. In a glass-blowing machine, in combination, a mold and a mold-carrier, means for imparting movements to the carrier, an air-conduit that is movable in unison with the mold and a removable blow-pipe which may be temporarily placed in connection with the air-conduit and in co-operative proximity to the mold, for the purpose substantially as set forth.

5. In a glass-blowing machine, a mold-carrier, with the mold thereon, and an air-supplying conduit, both movable, and having means for imparting traveling movements thereto in unison, a removable blow-pipe, and means comprised in said machine for affording a support for the blow-pipe whereby one end thereof may be in communication with the air-supplying conduit and the other in co-operative proximity to the mold, substantially as described.

6. In a glass-blowing machine, the combination with the vertical rotatable shaft having at its bottom a revoluble mold-carrier with the mold thereon, having at its top an air conduit which is revoluble in conjunction with the mold-carrier, and having an intermediate part, supported by, and revoluble by reason of the rotation of the shaft, for affording a temporary support for the blow-pipe whereby the top thereof may be in connection with said conduit, and the bottom in operative proximity to the mold, substantially as described.

7. In a glass-blowing machine, in combination, a mold-carrier, and a sectional opening and closing mold thereon, means for imparting movements to the carrier, an air-conduit that is movable in unison with the mold, a removable blow-pipe which may be temporarily placed in connection with the air-conduit and in co-operative proximity to the mold, and mechanism for periodically and automatically opening and closing the mold section, substantially as described.

8. In a glass-blowing machine, in combination, a mold and a mold-carrier, means for imparting movements to the carrier, an air-conduit that is movable in unison with the mold, a removable blow-pipe which may be temporarily placed in connection with the air-conduit and in co-operative proximity to the mold, a valve in said conduit and means for automatically and periodically operating the valve, substantially as described.

9. In a glass-blowing machine, in combination, a mold and a mold-carrier, means for imparting a traveling movement to the carrier, an air-conduit that is movable in unison with the mold, a blow-pipe which may be placed in connection with the air-conduit and in co-operative proximity to the mold, and means for imparting a rotary movement to the blow-pipe, substantially as and for the purposes set forth.

10. In a glass-blowing machine, in combination, a mold and mold-carrier, means for propelling the carrier to which the carrier is articulated whereby it may have a vertical swinging movement, a basin for a cooling liquid in the course of travel of the carrier, an air-conduit that is movable in unison with the mold, and a removable blow-pipe which may be temporarily placed in connection with the air-conduit, and in co-operative proximity to the mold, for the purpose substantially as set forth.

11. In a glass-blowing machine, in combination, a sectional mold and a mold-carrier, means for propelling the carrier to which the carrier is articulated whereby it may have a vertical swinging movement, to descend into the basin, a basin for a cooling liquid in the course of travel of the carrier, an air-conduit that is movable in unison with the travel of the mold, a removable blow-pipe which may be temporarily placed in connection with the air-conduit, and in co-operative proximity to the mold and means for automatically opening the mold sections as they approach the basin for the purposes substantially as set forth.

12. In a glass-blowing machine, in combination, the base A, the central vertical rotatable shaft having connected thereto near its bottom a revoluble mold-carrier with a mold thereon, having at its top an air-conduit which is revoluble in conjunction with the mold-carrier and having an intermediate horizontally extended part for affording a temporary support for the blow-pipe whereby the top thereof may be in connection with said air-conduit and the bottom in operative proximity to the mold, a gear, C, on said vertical shaft, the horizontal counter-shaft E, geared to the lower end of the vertical shaft, the driving-shaft, F, and gearing connecting it with the counter-shaft, substantially as described.

13. In a glass-blowing machine, the combination with the base having the track, $m$, of the vertical shaft, B, connected to and radially extended from the shaft and having a friction roll which runs on the track, the mold mounted on the carrier, a radial air-conduit carried by and extended from the upper part of the shaft and means for supporting, removably, a blow-pipe in connection with the said conduit and in proximity to the mold, substantially as described.

14. In a glass-blowing machine, the combination with the base having the basin, M, therein and the track, $m$, which runs around the top of the base and has its course continued in the basin of the vertical shaft, B, hinge-connected to, and radially extended from, the shaft and having a running bearing on said track, a mold mounted on the carrier and means for turning said shaft, substantially as described.

15. In a glass-blowing machine, in combination, the rotary shaft, the carrier having a mold thereon, connected to and outwardly extended from a member of the shaft, and having a slide movably guided thereon which is provided with a projection or roller, a rib-like part along which the said projection runs for a portion of its course whereby the slide is outwardly maintained, and a cam in engagement with which the roller at another part of its course runs for forcing the slide inwardly and connections between the slide and mold sections whereby the outward and inward movements of the slide close and open the sectional mold, substantially as described.

16. In a glass-blowing machine, in combination, the base, A, the shaft, B, the collar, G, fixed on the shaft having the ear-lugs, $d$, the mold-carriers, H, H, with bifurcated inner ends, hinged to the ear-lugs, $d$, and having the slide-ways, $g$, the sliding-block, L, on each of the carriers having combined therewith the stud, $h$, roller, $j$, and the annularly arranged arms, $i$, $i$, clamped on the upper end of the stud above the slide-block, by the nut, $i^2$, the mold sections, $e$, $e$, hinged on the mold-carriers, each having the outwardly extending lug, $e^3$, and the connecting-rods, $e^4$, all substantially as described and shown.

17. In a glass-blowing machine, in combination, a mold and mold-carrier, means for imparting revoluble movements to the carrier, and an air-conduit that is movable in unison with the mold, a removable blow-pipe which may be placed in connection with the air-conduit and in co-operative proximity to the mold, a depending tubular part, $Q^3$, rotatably mounted upon the revolubly carried air-conduit, to form a continuation thereof and the part which receives the engagement therewith of the upper end of the blow-pipe, a wheel or roller secured on said depending tubular rotatable part, and the arc-shaped fixture, S, on which the said wheel runs during a portion of the revoluble movement of the mold-carrier and air-conduit, substantially as described.

18. In a glass-blowing machine, the combination with the mold-carrier and the air-conduit, Q, horizontally thereabove, and means for revolubly moving both in unison of the depending rotary tubular continuation of the conduit, Q, having its lower end constructed for the engagement therewith of the upper end of a blow-pipe, substantially as and for the purposes set forth.

19. In a glass-blowing machine, the combination with the base having the upstanding hub, $b$, with the outstanding arc-formed flange $b^2$, and the eccentrically arranged cam-rib, $n$, of the mold-carriers having the slide, L, with the rollers, $j$, the sectional molds hinged together and mounted on the mold-carriers and means intervening between the slides and mold-sections actuated by the movements of the slide for opening and closing the mold sections, substantially as described.

20. In a glass-blowing machine, the combination with the base, formed with the basin, of the revolubly movable mold-carriers and hinged molds thereon, the mold-carriers being jointed to the support which revolubly propels it, whereby it may descend into the basin, means for opening the molds prior to such descent, springs for exerting a pressure to restrain the open molds from closing while in their lowered positions, and means for closing the molds after ascending from within the basin, substantially as described.

21. In a machine for blowing glass, one or more molds each consisting of hinged sections, a base on which said molds may move, having a depression in a portion of its surface in which said molds fall in succession when moved as aforesaid, means for moving said molds on said base, and for causing the same, severally, to open and close automatically while descending into and rising out of said depression, combined and operating substantially as set forth.

MICHAEL J. OWENS.

Witnesses:
JOHN A. HOWARD,
J. H. BEYMER.